United States Patent
Kodama et al.

(10) Patent No.: US 8,957,153 B2
(45) Date of Patent: Feb. 17, 2015

(54) ROOM-TEMPERATURE-CURABLE SILICONE RUBBER COMPOSITION

(75) Inventors: Harumi Kodama, Sodegaura (JP); Masayuki Onishi, Ichihara (JP)

(73) Assignee: Dow Corning Toray Co., Ltd., Chiyoda-Ku Tokyo (JP)

( * ) Notice: Subject to any disclaimer, the term of this patent is extended or adjusted under 35 U.S.C. 154(b) by 0 days.

(21) Appl. No.: 14/009,671

(22) PCT Filed: Mar. 28, 2012

(86) PCT No.: PCT/JP2012/059275
§ 371 (c)(1),
(2), (4) Date: Nov. 22, 2013

(87) PCT Pub. No.: WO2012/137854
PCT Pub. Date: Oct. 11, 2012

(65) Prior Publication Data
US 2014/0066570 A1    Mar. 6, 2014

(30) Foreign Application Priority Data
Apr. 4, 2011 (JP) ................................. 2011-083021

(51) Int. Cl.
C08L 83/04 (2006.01)
C08K 3/36 (2006.01)
C08L 83/14 (2006.01)
C08G 77/18 (2006.01)

(52) U.S. Cl.
CPC . C08K 3/36 (2013.01); C08L 83/14 (2013.01); C08G 77/18 (2013.01)
USPC .......... 524/863; 524/114; 524/261; 524/262; 524/264; 528/12; 528/16

(58) Field of Classification Search
USPC ............ 524/114, 261, 262, 264, 863; 528/12, 528/16
See application file for complete search history.

(56) References Cited

U.S. PATENT DOCUMENTS

| | | | |
|---|---|---|---|
| 4,711,928 A | 12/1987 | Lee et al. | |
| 4,871,827 A | 10/1989 | Klosowski et al. | |
| 5,053,442 A | 10/1991 | Chu et al. | |
| 2009/0286916 A1 | 11/2009 | Iwasaki et al. | |

FOREIGN PATENT DOCUMENTS

| | | |
|---|---|---|
| EP | 0304958 A2 | 3/1989 |
| JP | S5541702 B2 | 10/1980 |
| JP | S62207383 A | 9/1987 |
| JP | S62212488 A | 9/1987 |
| JP | H07113083 B2 | 12/1995 |
| JP | 2007231172 A | 9/2007 |

OTHER PUBLICATIONS

English language abstract not found for JP S62207383; However see English language equivalent US 4,871,827. Original document extracted from espacenet.com database on Apr. 24, 2014, 9 pages.
English language abstract not found for JP S62212488; However see English language equivalent US 4,711,928. Original document extracted from espacenet.com database on Apr. 24, 2014, 10 pages.
English language abstract not found for JP H07113083; However see English language equivalent EP 0304958. Original document extracted from espacenet.com database on Apr. 24, 2014, 6 pages.
English language abstract and machine translation for JP 2007231172 extracted from espacenet.com database on Apr. 24, 2014, 19 pages.
English language abstract for JP S5541702 extracted from espacenet.com database on Jun. 6, 2014. Original document extracted from PAJ database on Jun. 6, 2014, 9 pages.
International Search Report for PCT/JP2012/059275, dated Jul. 3, 2012, 3 pages.

*Primary Examiner* — Edward Cain
(74) *Attorney, Agent, or Firm* — Howard & Howard Attorneys PLLC

(57) ABSTRACT

A room-temperature-curable silicone rubber composition comprises: (A) an organopolysiloxane having on silicon atoms in the molecular chain in one molecule at least two specific alkoxysilyl-containing groups; (B) an organopolysiloxane having on silicon atom in the molecular chain neither a hydroxyl group nor an alkoxy group; (C) an alkoxysilane or its partial hydrolysis and condensation product; (D) a condensation reaction catalyst; and optionally comprises (E) an adhesion promoter and/or (F) a reinforcing filler. The composition cures at room temperature due to contact with atmospheric moisture and exhibits an excellent adhesiveness to substrate in contact with the composition during the cure of the composition.

11 Claims, No Drawings

ROOM-TEMPERATURE-CURABLE SILICONE RUBBER COMPOSITION

RELATED APPLICATIONS

This application is the National Stage of International Patent Application No. PCT/JP2012/059275, filed on Mar. 28, 2012, which claims priority to and all the advantages of Japanese Patent Application No. JP 2011-083021, filed on Apr. 4, 2011, the content of which is incorporated herein by reference.

TECHNICAL FIELD

The present invention relates to a room-temperature-curable silicone rubber composition that cures at room temperature under the effect of contact with atmospheric moisture and that exhibits an excellent adhesiveness to substrate in contact with the composition during the cure of the composition.

BACKGROUND ART

Room-temperature-curable silicone rubber compositions, which comprise a diorganopolysiloxane having on silicon atoms at both molecular chain terminals trimethoxysilyl-ethyl-containing groups represented by the following formula:

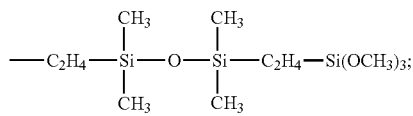

methyltrimethoxysilane; and an organotitanium compound, cure at room temperature under the effect of contact with atmospheric moisture {see Japanese Unexamined Patent Application Publication Nos. (hereinafter referred to as "Kokai") S62-207383, S62-212488 and 2007-231172}.

However, these compositions do not exhibit a satisfactory adhesiveness to substrate in contact with the compositions during the cure of the compositions.

It is an object of the present invention to provide a room-temperature-curable silicone rubber composition that cures at room temperature under the effect of contact with atmospheric moisture and that exhibits an excellent adhesiveness to substrate in contact with the composition during the cure of the composition.

DISCLOSURE OF INVENTION

The room-temperature-curable silicone rubber composition of the present invention comprises:
(A) 100 parts by mass of an organopolysiloxane having on silicon atoms in the molecular chain in one molecule at least two alkoxysilyl-containing groups represented by the following general formula:

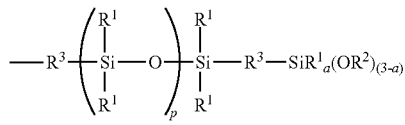

wherein each $R^1$ is independently selected from monovalent hydrocarbon groups that do not have an unsaturated aliphatic bond, $R^2$ is an alkyl group, each $R^3$ is independently selected from alkylene groups, "a" is an integer from 0 to 2, and "p" is an integer from 1 to 50;
(B) 1 to 100 parts by mass of an organopolysiloxane having on silicon atom in the molecular chain neither a hydroxyl group nor an alkoxy group;
(C) 0.5 to 30 parts by mass of an alkoxysilane or its partial hydrolysis and condensation product, wherein the alkoxysilane is represented by the following general formula:

$$R^4{}_b Si(OR^5)_{(4-b)}$$

wherein $R^4$ is a monovalent hydrocarbon group, $R^5$ is an alkyl group, and "b" is 0 or 1; and
(D) 0.1 to 10 parts by mass of a condensation reaction catalyst.

Effects Of Invention

The room-temperature-curable silicone rubber composition of the present invention cures at room temperature under the effect of contact with atmospheric moisture and exhibits an excellent adhesiveness for substrate in contact with the composition during the cure of the composition.

DETAILED DESCRIPTION OF THE INVENTION

Component (A), which is a main component of the present composition, is an organopolysiloxane having on silicon atoms in the molecular chain in one molecule at least two alkoxysilyl-containing groups represented by the following general formula:

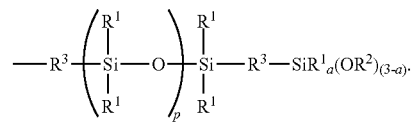

Each $R^1$ in this formula is independently selected from monovalent hydrocarbon groups that do not have an unsaturated aliphatic bond and can be exemplified by alkyl groups such as methyl, ethyl, propyl, butyl, pentyl, hexyl, heptyl, octyl, nonyl, decyl, and octadecyl; cycloalkyl groups such as cyclopentyl and cyclohexyl; aryl groups such as phenyl, tolyl, xylyl, and naphthyl; aralkyl groups such as benzyl, phenethyl, and phenylpropyl; and halogenated alkyl groups such as 3-chloropropyl and 3,3,3-trifluoropropyl, wherein alkyl, cycloalkyl, and aryl are preferred and the methyl group and phenyl group are particularly preferred. $R^2$ in the preceding formula is an alkyl group and can be exemplified by methyl, ethyl, propyl, butyl, pentyl, hexyl, heptyl, octyl, nonyl, decyl, and octadecyl and is preferably methyl or ethyl. Each $R^3$ in the preceding formula is independently selected from alkylene groups and can be exemplified by methylmethylene, ethylene, methylethylene, propylene, butylene, pentylene, hexylene, heptylene, and octylene, wherein methylmethylene, ethylene, methylethylene, and propylene are preferred. "a" in the preceding formula is an integer from 0 to 2 and is preferably 0 or 1. "p" in the preceding formula is an integer from 1 to 50 and is preferably an integer from 1 to 20, more preferably an integer from 1 to 10, and particularly preferably an integer from 1 to 5.

The alkoxysilyl-containing group can be exemplified by the group represented by the following formula:

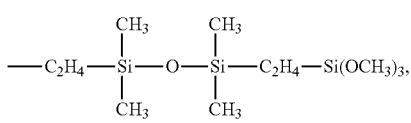

the group represented by the following formula:

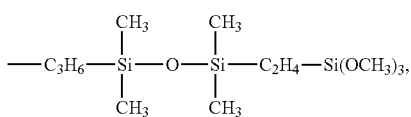

the group represented by the following formula:

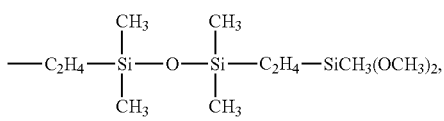

the group represented by the following formula:

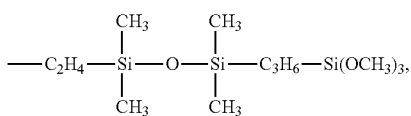

the group represented by the following formula:

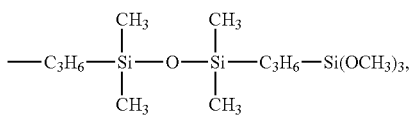

the group represented by the following formula:

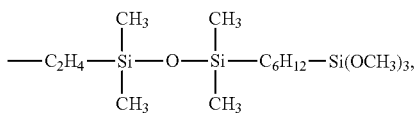

and the group represented by the following formula:

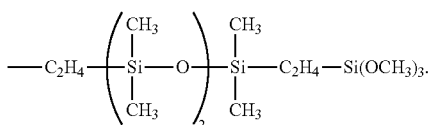

Silicon atom-bonded groups in the molecular chain of component (A) other than the above-described alkoxysilyl-containing group can be exemplified by alkyl groups such as methyl, ethyl, propyl, butyl, pentyl, hexyl, heptyl, octyl, nonyl, decyl, and octadecyl; cycloalkyl groups such as cyclopentyl and cyclohexyl; alkenyl groups such as vinyl, allyl, butenyl, pentenyl, hexenyl, and heptenyl; aryl groups such as phenyl, tolyl, xylyl, and naphthyl; aralkyl groups such as benzyl, phenethyl, and phenylpropyl; and halogenated alkyl groups such as 3-chloropropyl and 3,3,3-trifluoropropyl, wherein alkyl, cycloalkyl, alkenyl, and aryl are preferred and methyl, vinyl, and phenyl are particularly preferred. There are no limitations on the molecular structure of component (A), and the molecular structure of component (A) can be, for example, straight chain, partially branched straight chain, branched chain, and cyclic, wherein straight chain, partially branched straight chain, and branched chain are preferred. The alkoxysilyl-containing group may be bonded to silicon atom at the molecular chain terminals and/or may be bonded to silicon atom within the molecular chain. A preferred component (A) is an organopolysiloxane that has a straight chain molecular structure and that has the previously described alkoxysilyl-containing groups on silicon atoms at both molecular chain terminals. There are no limitation on a viscosity at 25° C. of component (A), but the viscosity is preferably in the range from 100 to 1,000,000 mPa·s and particularly preferably is in the range from 100 to 100,000 mPa·s. The resulting silicone rubber exhibits an increased mechanical strength when the viscosity of component (A) meets or exceeds the lower limit on the indicated range, while the obtained composition has enhanced handling properties when the upper limit on the indicated range is not exceeded.

The method for producing component (A) can be exemplified by the method described in Kokai S62-207383 and the method described in Kokai S62-212488.

Component (B) is a component that improves the adhesiveness of the present composition and is an organopolysiloxane having on silicon atoms in the molecular chain neither a hydroxyl group nor an alkoxy group. The silicon atom-bonded groups in component (B), excluding the hydroxyl group and alkoxy group, can be exemplified by alkyl groups such as methyl, ethyl, propyl, butyl, pentyl, hexyl, heptyl, octyl, nonyl, decyl, and octadecyl; cycloalkyl groups such as cyclopentyl and cyclohexyl; alkenyl groups such as vinyl, allyl, butenyl, pentenyl, hexenyl, and heptenyl; aryl groups such as phenyl, tolyl, xylyl, and naphthyl; aralkyl groups such as benzyl, phenethyl, and phenylpropyl; and halogenated alkyl groups such as 3-chloropropyl and 3,3,3-trifluoropropyl, wherein alkyl, cycloalkyl, alkenyl, and aryl are preferred and methyl, vinyl, and phenyl are particularly preferred. There are no limitations on the molecular structure of component (B), and the molecular structure of component (B) can be exemplified by straight chain, partially branched straight chain, branched chain, and cyclic, wherein straight chain, partially branched straight chain, and branched chain are preferred. There are no limitations on a viscosity at 25° C. of component (B), but the viscosity is preferably in the range from 10 to 1,000,000 mPa·s and particularly preferably is in the range from 50 to 100,000 mPa·s. Bleed out by component (B) from the obtained silicone rubber can be inhibited when the viscosity of component (B) meets or exceeds the lower limit on the indicated range, while the handling properties of the obtained composition are improved when the upper limit on the indicated range is not exceeded.

Considered per 100 parts by mass of component (A), a content of component (B) is in the range from 1 to 100 parts by mass, preferably in the range from 1 to 80 parts by mass, more preferably in the range from 1 to 70 parts by mass, and particularly preferably in the range from 1 to 60 parts by mass. The resulting composition exhibits an excellent adhesiveness when the content of component (B) meets or exceeds the lower limit on the indicated range, while bleed out by component (B) from the resulting silicone rubber can be inhibited when the upper limit on the indicated range is not exceeded. The content of component (B) is particularly preferably in the range from 15 to 60 parts by mass per 100 parts by mass of component (A) because this provides an excellent adhesiveness to organic resins.

Component (C) functions as a crosslinking agent for the present composition and is an alkoxysilane or its partial hydrolysis and condensation product, wherein the alkoxysilane is represented by the following general formula:

$$R^4_b Si(OR^5)_{(4-b)}$$

$R^4$ in this formula is a monovalent hydrocarbon group and can be exemplified by alkyl groups such as methyl, ethyl, propyl, butyl, pentyl, hexyl, heptyl, octyl, nonyl, decyl, and octadecyl; cycloalkyl groups such as cyclopentyl and cyclohexyl; alkenyl groups such as vinyl, allyl, butenyl, pentenyl, hexenyl, and heptenyl; aryl groups such as phenyl, tolyl, xylyl, and naphthyl; aralkyl groups such as benzyl, phenethyl, and phenylpropyl; and halogenated alkyl groups such as 3-chloropropyl and 3,3,3-trifluoropropyl, wherein alkyl, cycloalkyl, alkenyl, and aryl are preferred and methyl is particularly preferred. $R^5$ in the preceding formula is an alkyl group and can be exemplified by methyl, ethyl, propyl, butyl, pentyl, and hexyl wherein methyl is preferred. "b" in the preceding formula is 0 or 1.

Component (C) can be exemplified by trifunctional alkoxysilanes such as methyltrimethoxysilane, methyltriethoxysilane, ethyltrimethoxysilane, ethyltriethoxysilane, vinyltrimethoxysilane, and phenyltrimethoxysilane; by tetrafunctional alkoxysilanes such as tetramethoxysilane and tetraethoxysilane; and by the partial hydrolysis and condensation products of the preceding. A single alkoxysilane or partial hydrolysis and condensation product thereof may be used or a mixture of two or more may be used.

A content of component (C), expressed per 100 parts by mass of component (A), is in the range from 0.5 to 30 parts by mass, preferably in the range from 0.5 to 20 parts by mass, more preferably in the range from 0.5 to 15 parts by mass, and particularly preferably in the range from 0.5 to 10 parts by mass. When the content of component (C) meets or exceeds the lower limit on the indicated range, the obtained composition exhibits a satisfactory curability and the shelf life of the obtained composition under moisture exclusion is enhanced. On the other hand, the obtained composition will cure rapidly under the effect of atmospheric moisture when the upper limit on the indicated range is not exceeded.

Component (D) is a condensation reaction catalyst that accelerates crosslinking in the present composition. Component (D) can be exemplified by tin compounds such as dimethyltin dineodecanoate and stannous octoate and by titanium compounds such as tetra(isopropoxy)titanium, tetra(n-butoxy)titanium, tetra(t-butoxy)titanium, di(isopropoxy)bis(ethyl acetoacetate)titanium, di(isopropoxy)bis(methyl acetoacetate)titanium, and di(isopropoxy)bis(acetylacetonate)titanium.

A content of component (D), expressed per 100 parts by mass of component (A), is in the range from 0.1 to 10 parts by mass and preferably in the range from 0.1 to 6 parts by mass. The obtained composition will cure rapidly under the effect of atmospheric moisture when the content of component (D) meets or exceeds the lower limit on the indicated range, while, on the other hand, the shelf life of the obtained composition is improved when the upper limit on the indicated range is not exceeded.

The present composition preferably comprises (E) an adhesion promoter in order to improve the adhesiveness for organic resins in contact with the composition during the cure of the composition. Component (E) can be exemplified by epoxy group-containing alkoxysilanes such as 3-glycidoxypropyltrimethoxysilane, 3-glycidoxypropyltriethoxysilane, 3-glycidoxypropylmethyldimethoxysilane, epoxycyclohexyl)ethyltrimethoxysilane, and 4-oxiranylbutyltrimethoxysilane; acrylic group-containing alkoxysilanes such as 3-methacryloxypropyltrimethoxysilane, 3-methacryloxypropyltriethoxysilane, and 3-acryloxypropyltrimethoxysilane; amino group-containing alkoxysilanes such as 3-aminopropyltrimethoxysilane, 3-aminopropyltriethoxysilane, N-(2-aminoethyl)-3-aminopropyltrimethoxysilane, and N-phenyl-3-aminopropyltrimethoxysilane; and reaction mixtures between an epoxy group-containing alkoxysilane as described above and an amino group-containing alkoxysilane as described above, wherein reaction mixtures between an epoxy group-containing alkoxysilane as described above and an amino group-containing alkoxysilane as described above are particularly preferred. The method for preparing such a reaction mixture between an epoxy group-containing alkoxysilane and an amino group-containing alkoxysilane can be exemplified by the methods described in Japanese Examined Patent Application Publication Nos. S55-41702 and H07-113083.

A content of component (E) should be an amount that can impart a satisfactory adhesiveness by the present composition for organic resin in contact with the composition during the cure of the composition, but is not otherwise limited. Expressed per 100 parts by mass of component (A), the content of component (E) is preferably in the range from 0.01 to 10 parts by mass and more preferably in the range from 0.01 to 5 parts by mass. A thoroughly satisfactory adhesiveness to organic resins is obtained when the content of component (E) meets or exceeds the lower limit on the indicated range. On the other hand, the present composition cures rapidly under the effect of contact with atmospheric moisture when the upper limit on the indicated range is not exceeded.

(F) a reinforcing filler is preferably incorporated in the present composition in order to obtain additional improvements in the adhesiveness. Component (F) can be exemplified by fumed silica fine powder, precipitated silica fine powder, calcined silica fine powder, fumed titanium dioxide fine powder, and hydrophobed fine powders provided by subjecting the surface of the preceding to a surface treatment with, e.g., an organosilane, a silazane, a siloxane oligomer, and so forth. A content of component (F) is not limited, but is preferably 0.1 to 50 parts by mass per 100 parts by mass of component (A).

Insofar as the object of the present invention is not impaired, the present composition may contain other optional components, for example, a nonreinforcing filler such as quartz fine powder, calcium carbonate fine powder, diatomaceous earth fine powder, aluminum hydroxide fine powder, alumina fine powder, magnesium hydroxide fine powder, magnesia fine powder, zinc oxide fine powder, zinc carbonate fine powder, and hydrophobed nonreinforcing fillers provided by subjecting the surface of the preceding to a surface treatment with, e.g., an organosilane, a silazane, a siloxane oligomer, and so forth; as well as an organic solvent; an antifungal agent; a flame retardant; a heat stabilizer; a plasticizer; an agent that imparts thixotropy; a cure accelerator; and a pigment.

The present composition can be prepared by mixing components (A), (B), (C), and (D), the optional components (E) and (F), and any other optional components to uniformity while excluding moisture. The composition obtained thereby can be stored long-term by introducing it into a sealed container while excluding moisture and can cure rapidly under the effect of contact with atmospheric moisture to form a silicone rubber.

EXAMPLES

The room-temperature-curable silicone rubber composition of the present invention is described in detail by the examples. The viscosity reported in the examples is the value at 25° C. The adhesiveness of the room-temperature-curable silicone rubber composition was evaluated using the following method.

[Method for Evaluating the Adhesiveness of the Room-Temperature-Curable Silicone Rubber Compositions]

A bead of the room-temperature-curable silicone rubber composition was applied on the substrate, e.g., a glass plate, aluminum plate (Al plate), alumite-treated aluminum plate (alumite-treated Al plate), copper plate, phenolic resin plate, polybutylene terephthalate (PBT) resin plate, polyphenylene sulfide (PPS) resin plate, and polyethylene terephthalate (PET) resin plate. This was followed by standing for 7 days at a temperature of 23±2° C. and a humidity of 50±5% in order to cure the room-temperature-curable silicone rubber composition. The resulting silicone rubber was then peeled from the substrate using a spatula and the percentage of the area of the silicone rubber that underwent cohesive failure with respect to the area of adhesion by the silicone rubber was determined (CF ratio). A CF ratio of 100% means that the silicone rubber exhibited an excellent adhesiveness for the substrate, while a CF ratio of 0% means that the silicone rubber underwent peeling at the interface with the substrate.

Component (A-1): a dimethylpolysiloxane having a viscosity of 10,000 mPa·s and having on silicon atoms at both molecular chain terminals trimethoxysilylethyl-containing groups represented by the following formula:

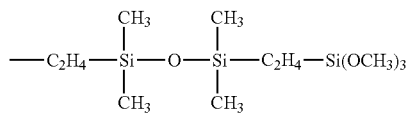

Component (A-2): a dimethylpolysiloxane having a viscosity of 500 mPa·s and having on silicon atoms at both molecular chain terminals trimethoxysilylethyl-containing groups represented by the following formula:

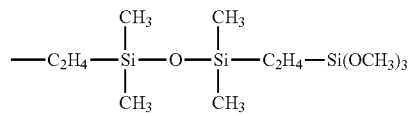

Component (B-1): a dimethylpolysiloxane having a viscosity of 500 mPa·s and having trimethylsiloxy groups on silicon atoms at both molecular chain terminals.

Component (B-2): a dimethylpolysiloxane having a viscosity of 100 mPa·s and having trimethylsiloxy groups on silicon atoms at both molecular chain terminals.

Component (B-3): a dimethylpolysiloxane having a viscosity of 9,000 mPa·s and having dimethylvinylsiloxy groups on silicon atoms at both molecular chain terminals.

Component (B-4): a dimethylpolysiloxane having a viscosity of 40,000 mPa·s and having dimethylvinylsiloxy groups on silicon atoms at both molecular chain terminals.

Component (B-5): a dimethylpolysiloxane having a viscosity of 400 mPa·s and having dimethylvinylsiloxy groups on silicon atoms at both molecular chain terminals.

Component (C-1): methyltrimethoxysilane

Component (D-1): titanium diisopropoxybis(ethyl acetoacetate)

Component (E-1): a reaction mixture provided by reacting 3-glycidoxypropyltrimethoxysilane and 3-aminopropyltrimethoxysilane with a 2:1 molar ratio.

Component (F-1): fumed silica fine powder having a specific surface area by the BET method of 130 m$^2$/g and having a surface treated with hexamethyldisilazane.

Examples 1 to 12 and Comparative Example 1

Room-temperature-curable silicone rubber compositions were prepared by mixing components (A-1), (B-1), (B-2), (B-3), (B-4), (C-1), (D-1) and (E-1) in the blend amounts shown in Table 1 to uniformity while excluding moisture. The adhesiveness of these room-temperature-curable silicone rubber compositions was evaluated and the results are given in Table 1.

TABLE 1

| | | Examples | | | | | | | | | | | | Comparative |
| --- | --- | --- | --- | --- | --- | --- | --- | --- | --- | --- | --- | --- | --- | --- |
| | | 1 | 2 | 3 | 4 | 5 | 6 | 7 | 8 | 9 | 10 | 11 | 12 | Example 1 |
| Composition (parts by mass) | component (A-1) | 100 | 100 | 100 | 100 | 100 | 100 | 100 | 100 | 100 | 100 | 100 | 100 | 100 |
| | component (B-1) | 5 | 10 | 20 | 0 | 0 | 0 | 20 | 20 | 20 | 20 | 30 | 50 | 0 |
| | component (B-2) | 0 | 0 | 0 | 20 | 0 | 0 | 0 | 0 | 0 | 0 | 0 | 0 | 0 |
| | component (B-3) | 0 | 0 | 0 | 0 | 20 | 0 | 0 | 0 | 0 | 0 | 0 | 0 | 0 |
| | component (B-4) | 0 | 0 | 0 | 0 | 0 | 20 | 0 | 0 | 0 | 0 | 0 | 0 | 0 |
| | component (C-1) | 2 | 2 | 2 | 2 | 2 | 2 | 5 | 2 | 2 | 2 | 2 | 2 | 2 |
| | component (D-1) | 2 | 2 | 2 | 2 | 2 | 2 | 2 | 2 | 2 | 2 | 2 | 2 | 2 |
| | component (E-1) | 0 | 0 | 0 | 0 | 0 | 0 | 0 | 0.1 | 0.2 | 0.5 | 0 | 0 | 0 |
| Adhesiveness (CF %) | glass plate | 100 | 100 | 100 | 100 | 100 | 100 | 100 | 100 | 100 | 100 | 100 | 100 | 0 |
| | Al plate | 100 | 100 | 100 | 100 | 100 | 100 | 100 | 100 | 100 | 100 | 100 | 100 | 0 |
| | alumite-treated Al plate | 100 | 100 | 100 | 100 | 100 | 100 | 100 | 100 | 100 | 100 | 100 | 100 | 0 |
| | PBT resin plate | 0 | 0 | 0 | 0 | 0 | 0 | 30 | 100 | 100 | 100 | 0 | 0 | 0 |
| | PPS resin plate | 0 | 0 | 0 | 0 | 0 | 0 | 30 | 100 | 100 | 100 | 0 | 0 | 0 |
| | PET resin plate | 0 | 0 | 100 | 100 | 100 | 100 | 100 | 100 | 100 | 100 | 100 | 100 | 0 |

Examples 13 to 16 and Comparative Example 2

Room-temperature-curable silicone rubber compositions were prepared by mixing components (A-2), (B-1), (C-1), (D-1) and (E-1) in the blend amounts shown in Table 2 to uniformity while excluding moisture. The adhesiveness of these room-temperature-curable silicone rubber compositions was evaluated and the results are given in Table 2.

TABLE 2

|  |  | Examples | | | | Comparative |
|---|---|---|---|---|---|---|
|  |  | 13 | 14 | 15 | 16 | Example 2 |
| Composition (parts by mass) | component (A-2) | 100 | 100 | 100 | 100 | 100 |
| | component (B-1) | 20 | 20 | 20 | 20 | 0 |
| | component (C-1) | 2 | 2 | 2 | 2 | 2 |
| | component (D-1) | 2 | 2 | 2 | 2 | 2 |
| | component (E-1) | 0.2 | 0.5 | 1 | 2 | 0 |
| Adhesiveness (CF %) | glass plate | 100 | 100 | 100 | 100 | 0 |
| | Al plate | 100 | 100 | 100 | 100 | 0 |
| | alumite-treated Al plate | 100 | 100 | 100 | 100 | 0 |
| | PET resin plate | 100 | 100 | 100 | 100 | 0 |

Examples 17 and 18 and Comparative Example 3

Room-temperature-curable silicone rubber compositions were prepared by mixing components (A-2), (B-1), (C-1), (D-1), (E-1), and (F-1) in the blend amounts shown in Table 3 to uniformity while excluding moisture. The adhesiveness of these room-temperature-curable silicone rubber compositions was evaluated and the results are given in Table 3.

TABLE 3

|  |  | Examples | | Comparative Example |
|---|---|---|---|---|
|  |  | 17 | 18 | 3 |
| Composition (parts by mass) | component (A-2) | 100 | 100 | 100 |
| | component (B-1) | 20 | 40 | 0 |
| | component (C-1) | 2 | 2 | 2 |
| | component (D-1) | 2 | 2 | 2 |
| | component (E-1) | 0.3 | 0.3 | 0.3 |
| | component (F-1) | 4 | 4 | 4 |
| Adhesiveness (CF %) | copper plate | 100 | 100 | 80 |
| | PPS resin plate | 100 | 100 | 0 |

INDUSTRIAL APPLICABILITY

The room-temperature-curable silicone rubber composition of the present invention, because it cures at room temperature under the effect of contact with atmospheric moisture and exhibits an excellent adhesiveness for substrate in contact with the composition during the cure of the composition, is well adapted for use as a sealant for electrical and electronic components, as an adhesive, and as a moisture proof coating agent.

The invention claimed is:

1. A room-temperature-curable silicone rubber composition comprising:
   (A) 100 parts by mass of an organopolysiloxane having on silicon atoms in the molecular chain in one molecule at least two alkoxysilyl-containing groups represented by the following general formula:

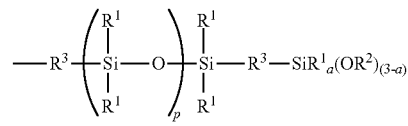

wherein each $R^1$ is independently selected from monovalent hydrocarbon groups that do not have an unsaturated aliphatic bond, $R^2$ is an alkyl group, each $R^3$ is independently selected from alkylene groups, "a" is an integer from 0 to 2, and "p" is an integer from 1 to 50;
   (B) 1 to 100 parts by mass of an organopolysiloxane having on silicon atoms in the molecular chain neither a hydroxyl group nor an alkoxy group;
   (C) 0.5 to 30 parts by mass of an alkoxysilane or its partial hydrolysis and condensation product, wherein the alkoxysilane is represented by the following general formula:

$$R^4_b Si(OR^5)_{(4-b)}$$

wherein $R^4$ is a monovalent hydrocarbon group, $R^5$ is an alkyl group, and "b" is 0 or 1; and
   (D) 0.1 to 10 parts by mass of a condensation reaction catalyst.

2. The room-temperature-curable silicone rubber composition according to claim 1, wherein a viscosity at 25° C. of component (A) is 100 to 1,000,000 mPa·s.

3. The room-temperature-curable silicone rubber composition according to claim 1, wherein component (A) is a straight-chain organopolysiloxane having alkoxysilyl-containing groups on silicon atoms at both molecular chain terminals.

4. The room-temperature-curable silicone rubber composition according to claim 1, wherein the alkoxysilyl-containing group in component (A) is a group represented by the following formula:

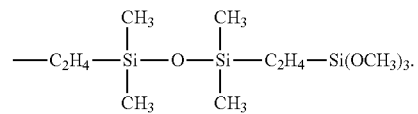

5. The room-temperature-curable silicone rubber composition according to claim 1, wherein a viscosity at 25° C. of component (B) is 10 to 1,000,000 mPa·s.

6. The room-temperature-curable silicone rubber composition according to claim 1, further comprising (E) an adhesion promoter in a quantity of 0.01 to 10 parts by mass per 100 parts by mass of component (A).

7. The room-temperature-curable silicone rubber composition according to claim 6, wherein component (E) is at least one adhesion promoter selected from the group consisting of epoxy group-containing alkoxysilanes, acrylic group-containing alkoxysilanes, amino group-containing alkoxysilanes, and the reaction mixtures of an epoxy group-containing alkoxysilane and an amino group-containing alkoxysilane.

8. The room-temperature-curable silicone rubber composition according to claim 1, further comprising (F) a reinforcing filler in a quantity of 0.1 to 50 parts by mass per 100 parts by mass of component (A).

9. The room-temperature-curable silicone rubber composition according to claim 8, wherein component (F) is at least one reinforcing filler selected from the group consisting of fumed silica fine powder, precipitated silica fine powder, calcined silica fine powder, and fumed titanium oxide fine powder.

10. The room-temperature-curable silicone rubber composition according to claim 3, wherein the alkoxysilyl-containing group in component (A) is a group represented by the following formula:

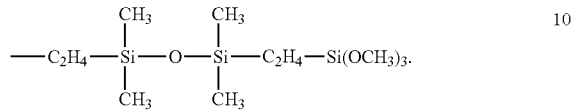

11. The room-temperature-curable silicone rubber composition according to claim 1, wherein a viscosity at 25° C. of component (A) is 100 to 100,000 mPa·s.

* * * * *